United States Patent
Hosoda (10) Patent No.: US 9,602,007 B2
(45) Date of Patent: Mar. 21, 2017

(54) POWER CONVERSION APPARATUS

(71) Applicant: DENSO CORPORATION, Kariya, Aichi-pref. (JP)

(72) Inventor: Tsuyoshi Hosoda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/615,627

(22) Filed: Feb. 6, 2015

(65) Prior Publication Data
US 2015/0229218 A1  Aug. 13, 2015

(30) Foreign Application Priority Data

Feb. 7, 2014  (JP) ................. 2014-022013

(51) Int. Cl.
| | | |
|---|---|---|
| H02J 7/00 | (2006.01) | |
| H02M 3/335 | (2006.01) | |
| H02M 3/28 | (2006.01) | |
| H02M 1/32 | (2007.01) | |

(52) U.S. Cl.
CPC ....... *H02M 3/33507* (2013.01); *H02M 3/285* (2013.01); *H02M 3/33569* (2013.01); *H02M 3/33592* (2013.01); *H02M 1/32* (2013.01); *Y02B 70/1475* (2013.01)

(58) Field of Classification Search
CPC ....... H02M 2007/53878; H02M 3/285; H02M 3/33507; H02M 3/335; H02J 7/0013; B60L 11/1868; Y02T 10/7066
USPC ............ 363/16–17, 21.01, 21.04, 21.08, 62, 363/65–67, 71; 323/207, 225, 266, 267, 323/282–285; 320/2, 32, 138
See application file for complete search history.

(56) References Cited

U.S. PATENT DOCUMENTS

| | | | | |
|---|---|---|---|---|
| 5,576,940 A | * | 11/1996 | Steigerwald | H02J 1/102 363/17 |
| 5,633,577 A | * | 5/1997 | Matsumae | H02J 7/0013 320/104 |
| 6,381,155 B1 | * | 4/2002 | Kadatsky | H02M 1/34 363/65 |

(Continued)

FOREIGN PATENT DOCUMENTS

| | | |
|---|---|---|
| JP | 2003-164146 | 6/2003 |
| JP | 2004-260887 | 9/2004 |

(Continued)

*Primary Examiner* — Rajnikant Patel
(74) *Attorney, Agent, or Firm* — Nixon & Vanderhye P.C.

(57) ABSTRACT

A power conversion apparatus includes a first DC/DC converter which includes a first transformer, a first primary circuit provided at a primary side of the first transformer, and a first secondary circuit provided at a secondary side of the first transformer. The first secondary circuit includes sets of a switching element and a free-wheel diode, which is connected between an input terminal and an output terminal of the switching element, to perform synchronous rectification operation and diode rectification operation. The apparatus includes a second DC/DC converter which includes a second transformer, a second primary circuit provided at a primary side of the second transformer, and a second secondary circuit provided at a secondary side of the second transformer. The second secondary circuit includes a plurality of rectifier diodes, which are arranged in parallel with each other, to perform the diode rectification operation constantly.

3 Claims, 3 Drawing Sheets

(56) References Cited

U.S. PATENT DOCUMENTS

| | | | | |
|---|---|---|---|---|
| 6,751,107 B2* | 6/2004 | Matsuda | ............... | H02M 3/285 363/67 |
| 6,934,166 B2* | 8/2005 | Vinciarelli | ............ | H02M 1/088 363/17 |
| 2007/0290656 A1* | 12/2007 | Keung | .................... | H02M 3/28 323/207 |
| 2013/0099559 A1 | 4/2013 | Machi et al. | | |

FOREIGN PATENT DOCUMENTS

| JP | 2007-124850 | 5/2007 |
|---|---|---|
| JP | 2013-090517 | 5/2013 |

* cited by examiner

POWER CONVERSION APPARATUS

CROSS-REFERENCE TO RELATED APPLICATION

This application is based on and claims the benefit of priority from earlier Japanese Patent Application No. 2014-22013 filed Feb. 7, 2014, the description of which is incorporated herein by reference.

BACKGROUND

Technical Field

The present invention relates to a power conversion apparatus including a plurality of DC/DC converters connected in parallel with each other.

Related Art

JP-A-2003-164146 discloses this type of apparatus. This apparatus has a configuration in which a plurality of synchronous rectification type DC/DC converters are connected in parallel with each other.

In addition, JP-A-2013-90517 discloses an apparatus having a configuration in which a plurality of diode rectification type DC/DC converters are connected in parallel with each other. Compared to this, the apparatus disclosed in JP-A-2003-164146 can achieve higher conversion efficiency, though the circuit is complicated and manufacturing cost increases.

However, the above apparatus is provided with an additional circuit configuration to resolve problems such as a failure (breakage of switching elements) due to backflow of current at the secondary sides of the DC/DC converters.

SUMMARY

As an aspect of the embodiment, a power conversion apparatus includes: a first DC/DC converter which includes a first transformer, a first primary circuit provided at a primary side of the first transformer, and a first secondary circuit provided at a secondary side of the first transformer, the first secondary circuit including sets of a switching element and a free-wheel diode, which is connected between an input terminal and an output terminal of the switching element, to perform synchronous rectification and diode rectification; and a second DC/DC converter which includes a second transformer, a second primary circuit provided at a primary side of the second transformer, and a second secondary circuit provided at a secondary side of the second transformer, the second secondary circuit including a plurality of rectifier diodes, which are arranged in parallel with each other, to perform the diode rectification constantly.

DETAILED DESCRIPTION OF THE PREFERRED EMBODIMENTS

With reference to the accompanying drawings, hereinafter are described embodiments of the present invention.

(Overall Configuration of Electric Power System)

Figure 1:
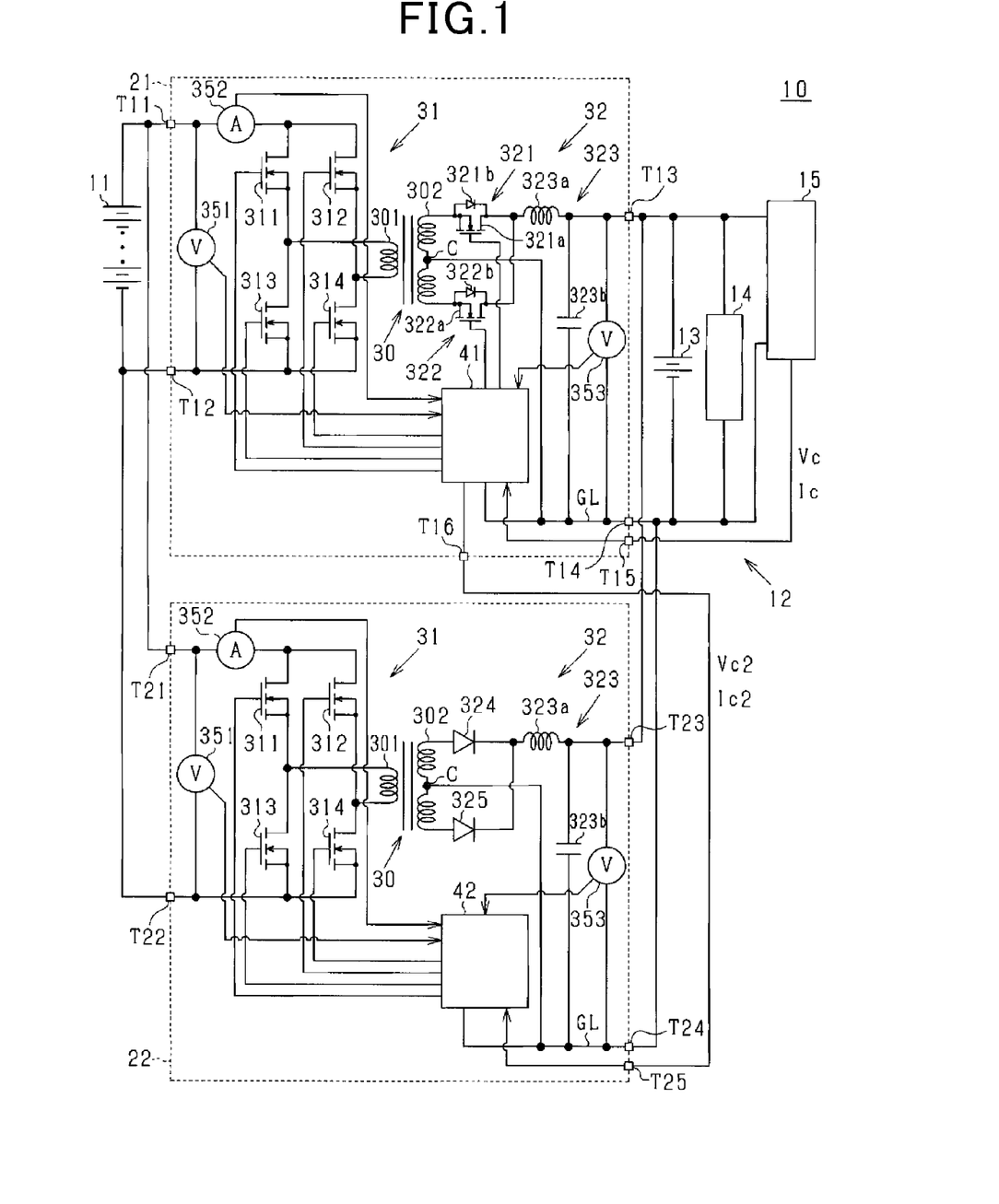
FIG. 1 is a diagram schematically showing a circuit configuration of an electrical power system including a power conversion apparatus according to an embodiment.

An electric power system 10 shown in FIG. 1 is installed in an electrically driven vehicle such as a hybrid automobile. The electric power system 10 includes a high-voltage battery 11, a power conversion apparatus 12, a low-voltage battery 13, an in-vehicle load 14, a vehicle ECU (Electric Control Unit) 15.

The high-voltage battery 11 is a secondary battery (e.g. lithium-ion storage battery) configuring a DC power source and can output a predetermined voltage (e.g. 288V) higher than the output voltage of the low-voltage battery 13. The power conversion apparatus 12 can convert the high-voltage DC power outputted from the high-voltage battery 11 into DC power having a predetermined low voltage (e.g. 12V).

The power conversion apparatus 12 includes a first converter 21 and a second converter 22 which are DC/DC converters connected in parallel with each other. That is, a high-voltage side input terminal T11 of the first converter 21 is connected to a high-voltage side terminal (positive electrode side terminal) of the high-voltage battery 11. In addition, a low-voltage side input terminal T12 of the first converter 21 is connected to a low-voltage side terminal (negative electrode side terminal) of the high-voltage battery 11. Similarly, a high-voltage side input terminal T21 of the second converter 22 is connected to a high-voltage side terminal of the high-voltage battery 11. In addition, a low-voltage side input terminal T22 of the second converter 22 is connected to a low-voltage side terminal of the high-voltage battery 11.

The low-voltage battery 13, the in-vehicle load 14, and the vehicle ECU 15 are connected to the output side of the power conversion apparatus 12 (in the embodiment, a parallel connection of the first converter 21 and the second converter 22). That is, a high-voltage side output terminal T13 of the first converter 21 and a high-voltage side output terminal T23 of the second converter 22 are connected to high-voltage side terminals of the low-voltage battery 13, the in-vehicle load 14, and the vehicle ECU 15. Similarly, a low-voltage side output terminal T14 of the first converter 21 and a low-voltage side output terminal T24 of the second converter 22 are connected to the low-voltage battery 13, the in-vehicle load 14, and a low-voltage side terminal of the vehicle ECU 15.

The low-voltage battery 13 is a secondary battery (e.g. lead-acid storage battery) configuring a DC power source and can output a predetermined voltage (e.g. 12V) lower than output voltage of the high-voltage battery 11. The in-vehicle load 14 is electric equipment (air-conditioning unit, audio equipment, lighting equipment and the like) installed in the electrically driven vehicle and is provided so as to be driven by output of the power conversion apparatus 12 and/or the low-voltage battery 13.

The vehicle ECU 15 is an electronic control unit which performs centralized control for units (including the power conversion apparatus 12 and the in-vehicle load 14) of the electrically driven vehicle and includes therein a microcomputer having a ROM, a RAM and a CPU. The vehicle ECU 15 operates by receiving electric supply from the low-voltage battery 13. That is, the vehicle ECU 15 calculates a command value of output voltage Vo of the power conversion apparatus 12 based on an operating condition of the electrically driven vehicle and outputs the command value to the power conversion apparatus 12.

<Configuration of Power Conversion Apparatus>

Hereinafter, the configuration of the power conversion apparatus 12 is described in detail. In the present embodiment, the first converter 21, which corresponds to a first DC/DC converter, operates as a master converter which is of a higher order than the second converter 22, while the second converter 22, which corresponds to a second DC/DC converter, operates as a slave converter dependent on the first converter 21.

That is, the first converter 21 has a control input terminal T15 and a control output terminal T16. The control input terminal T15 is provided so as to receive various control signals (including the command value) outputted from the vehicle ECU 15. The control output terminal T16 is provided so as to output various control signals to the second converter 22. In addition, the second converter 22 has a control input terminal T25. The control input terminal T25 is connected to the control output terminal T16 of the first converter 21.

The first converter 21 is a so-called isolated DC/DC converter and includes a transformer 30, a primary circuit 31, a secondary circuit 32, and a control circuit 41. Note that the transformer 30 of the first converter 21 corresponds to a first transformer. Similarly, the primary circuit 31 of the first converter 21 corresponds to a first primary circuit. The secondary circuit 32 of the first converter 21 corresponds to a first secondary circuit.

The second converter 22 is also a so-called isolated DC/DC converter and includes a configuration substantially similar to that of the first converter 21. That is, the second converter 22 includes a transformer 30, a primary circuit 31, a secondary circuit 32, and a control circuit 41. Note that the transformer 30 of the second converter 22 corresponds to a second transformer. Similarly, the primary circuit 31 of the second converter 22 corresponds to a second primary circuit. The secondary circuit 32 of the second converter 22 corresponds to a second secondary circuit.

Hereinafter, internal circuit configurations of the first converter 21 and the second converter 22 are described in detail. In the present embodiment, the transformer 30 of the first converter 21 and the transformer 30 of the second converter 22 have the same configuration. In the first converter 21 and the second converter 22, the primary circuit 31 is provided at the primary side of the transformer 30. The secondary circuit 32 is provided at the secondary side of the transformer 30. That is, a primary coil 301 of the transformer 30 is connected the primary circuit 31. A secondary coil 302 of the transformer 30 is connected the secondary circuit 32.

The primary circuits 31 of the first converter 21 and the second converter 22 are so-called full-bridge circuits and include four switching elements 311 to 314. In the present embodiment, the primary circuit 31 of the first converter 21 and the primary circuit 31 of the second converter 22 have the same configuration.

That is, in the first converter 21, input terminals of the switching elements 311 and 312 at the high-potential (upper arm) side are connected to a high-voltage side terminal of the high-voltage battery 11 via the high-voltage side input terminal T11. Output terminals of the switching elements 313 and 314 at the low-potential (lower arm) side are connected to a low-voltage side terminal of the high-voltage battery 11 via the low-voltage side input terminal T12.

Similarly, in the second converter 22, input terminals of the switching elements 311 and 312 at the high-potential side are connected to a high-voltage side terminal of the high-voltage battery 11 via the high-voltage side input terminal T21. Output terminals of the switching elements 313 and 314 at the low-potential side are connected to a low-voltage side terminal of the high-voltage battery 11 via the low-voltage side input terminal T22.

In addition, in the first converter 21 and the second converter 22, a connection between the switching element 311 and the switching element 313, which are connected to each other in series, is connected to one end of the primary coil 301. A connection between the switching element 312 and the switching element 314, which are connected to each other in series, is connected to the other end of the primary coil 301.

Note that, as shown in FIG. 1, in the present embodiment, N-channel MOS transistors are used as the switching elements 311 to 314. In addition, in each of the switching elements 311 to 314, a free-wheel diode (not shown) is connected between the input terminal (drain) and the output terminal (source). The free-wheel diode may be a parasitic diode of the switching element 311 or the like, or may be externally provided for the switching element 311.

The configuration of the secondary circuit 32 of the first converter 21 and that of the secondary circuit 32 of the second converter 22 are different from each other. That is, the secondary circuit 32 of the first converter 21 includes a synchronous rectification element 321 (including a switching element 321a and a free-wheel diode 321b), a synchronous rectification element 322 (including a switching element 322a and a free-wheel diode 322b), and a smoothing circuit 323 (including a reactor 323a and a capacitor 323b). The secondary circuit 32 of the second converter 22 includes a smoothing circuit 323 (including a reactor 323a and a capacitor 323b) and rectifier diodes 324 and 325.

In the first converter 21, as described above, the synchronous rectification element 321 has the switching element 321a and the free-wheel diode 321b. The switching element 321a is an N-channel MOS transistor whose input terminal (drain) is connected to one end of the secondary coil 302. The free-wheel diode 321b is connected between the input terminal and an output terminal (source) of the switching element 321a. The free-wheel diode 321b may be a parasitic diode, or may be externally provided. In addition, a center tap C of the secondary coil 302 is connected a ground line GL. The ground line GL is connected to the low-voltage side output terminal T14.

Similarly, as described above, the synchronous rectification element 322 has the switching element 322a and the free-wheel diode 322b. The switching element 322a is an N-channel MOS transistor whose input terminal is connected to the other end of the secondary coil 302. The free-wheel diode 322b is connected between the input terminal and an output terminal of the switching element 322a. The free-wheel diode 322b may be a parasitic diode, or may be externally provided.

The smoothing circuit 323 is a so-called LC filter and, as described above, includes a reactor 323a and a capacitor 323b. In the first converter 21, one end of the reactor 323a is connected to output terminals of the switching elements 321a and 322a. The other end of the reactor 323a is connected to the high-voltage side output terminal T13. The capacitor 323b is provided between the other end of the reactor 323a and the ground line GL.

That is, the first converter 21 includes the synchronous rectification element 321, which is a set (group) of the switching element 321a and the free-wheel diode 321b, and the synchronous rectification element 321, which is a set (group) of the switching element 322a and the free-wheel diode 322b. Hence, the first converter 21 can achieve two rectification modes (synchronous rectification operation and diode rectification operation).

In the second converter 22, the anode of the rectifier diode 324 is connected to one end of the secondary coil 302. The anode of the rectifier diode 325 is connected to the other end of the secondary coil 302. The cathode of the rectifier diode 324 and the cathode of the rectifier diode 325 are short-circuited. In addition, a center tap C of the secondary coil 302 is connected the ground line GL. The ground line GL is connected to the low-voltage side output terminal T24.

In the second converter 22, one end of the reactor 323a is connected to the cathodes of the rectifier diodes 324 and 325. The other end of the reactor 323a is connected to the high-voltage side output terminal T23. The capacitor 323b is provided between the other end of the reactor 323a and the ground line GL.

That is, the second converter 22 includes a pair of the rectifier diodes 324 and 325 arranged in parallel with each other. Hence, the second converter 22 performs the diode rectification operation constantly.

In the first converter 21 and the second converter 22, the primary circuit 31 is provided with an input voltage sensor 351 and an input current sensor 352. The input voltage sensor 351 is provided so as to generate an output corresponding to voltage between the input side terminals of the primary circuit 31 (input voltage). The input current sensor 352 is a so-called current transformer which is provided so as to generate an output corresponding to current flowing into the primary circuit 31 (input current). The output voltage sensor 353 is provided in the secondary circuit 32. The output voltage sensor 353 is provided so as to generate an output corresponding to voltage between the terminals of the secondary circuit 32 (output voltage).

That is, in the first converter 21, the input voltage sensor 351 is provided so as to generate an output corresponding to voltage between the high-voltage side input terminal T11 and the low-voltage side input terminal T12. The input current sensor 352 is interposed between the high-voltage side input terminal T11 and the input terminal of and the switching element 311. The output voltage sensor 353 is provided so as to generate an output corresponding to voltage between the high-voltage side output terminal T13 and the low-voltage side output terminal T14.

Similarly, in the second converter 22, the input voltage sensor 351 is provided so as to generate an output corresponding to voltage between the high-voltage side input terminal T21 and the low-voltage side input terminal T22. The input current sensor 352 is interposed between the high-voltage side input terminal T21 and the input terminal of the switching element 311. The output voltage sensor 353 is provided so as to generate an output corresponding to voltage between the high-voltage side output terminal T23 and the low-voltage side output terminal T24.

The control circuits 41 and 42 are ECUs which are of a lower order than the vehicle ECU 15, and include therein a microcomputer including a ROM, a RAM, and a CPU. The ROM previously stores a control program for controlling operation of the electric power system 10 and a map (look-up table) which is referred to when executing the control program. The RAM can temporarily store data when the CPU executes the control program. The CPU performs the control program to generate and output various control signals.

The control circuit 41 is provided so as to control operations of the switching elements 311 to 314 included in the primary circuit 31 of the first converter 21. In addition, the control circuit 41 is provided so as to control operations of the switching elements 321a and 322a included in the secondary circuit 32 of the first converter 21.

That is, in the present embodiment, the control circuit 41 generates and outputs various control signals based on, in addition to input voltage, input current, and output voltage of the first converter 21, an output voltage command value Vc received from the vehicle ECU 15 via the control input terminal T15. The various control signals include input signals (hereinafter, simply referred to as "PWM control signals") for control terminals (gate terminals) of the switching elements 311 to 314 included in the primary circuit 31 of the first converter 21, and input signals (hereinafter, simply referred to as "rectification operation control signals") for control terminals (gate terminals) of the switching elements 321a and 322a included in the secondary circuit 32 of the first converter 21.

In addition, the various control signals include an output voltage command value Vc2 and/or an output current command value Ic2 for the second converter 22. That is, the control circuit 41 sets an output target value (output voltage command value Vc2 and/or output current command value Ic2) of the second converter 22, and transmits the output target value to the second converter 22 via the control output terminal T16.

The control circuit 42 generates and outputs PWM control signals (input signals for control terminals of the switching elements 311 to 314 included in the primary circuit 31 of the second converter 22) of the second converter 22 based on, in addition to input voltage, input current, and output voltage of the second converter 22, the output target command value received from the control circuit 41 via the control input terminal T25.

As described above, in the present embodiment, the control circuit 41 controls operations of the primary circuit 31 and the secondary circuit 32 of the first converter 21, while inputting the output target value into the second converter 22 (control circuit 42) to control operation of the second converter 22. Specifically, in the present embodiment, prior to shifting the second converter 22 from an output stop state to an output operation state, the control circuit 41 stops operations of the switching elements 321a and 322a included in the secondary circuit 32 of the first converter 21 (makes a control terminal input signal, that is, a gate signal, to be an off state) to make the first converter 21 perform the diode rectification operation.

<Operation>

Hereinafter, operation by the configuration of the present embodiment is described.

The control circuit 41 of the first converter 21 receives the output voltage command value Vc, which is calculated by the vehicle ECU 15 based on the operating condition of the electrically driven vehicle, from the vehicle ECU 15 via the control input terminal T15. In addition, the control circuit 41 obtains the input voltage (hereinafter, referred to as "input voltage Vi1") of the first converter 21 based on the output of the input voltage sensor 351. Similarly, the control circuit 41 obtains the input current (hereinafter, referred to as "input current Ii1") of the first converter 21 based on the output of the input current sensor 352. In addition, the control circuit 41 obtains the output voltage (hereinafter, referred to as "output voltage Vo1") of the first converter 21 based on the output of the output voltage sensor 353.

Next, the control circuit 41 generates the PWM control signals and the rectification operation control signals of the first converter 21, and the output target values (output current command value Ic2 and/or output voltage command value Vc2) of the second converter 22, based on the received output voltage command value Vc, and the obtained input voltage Vi1, input current Ii1, and output voltage Vo1.

The control circuit 41 performs, based on the PWM control signals, PWM control for the four switching elements 311 to 314 included in the primary circuit 31 of the first converter 21. In addition, the control circuit 41 controls, based on the rectification operation control signals, operations of the switching elements 321$a$ and 322$a$ included in the secondary circuit 32 of the first converter 21. In addition, the control circuit 41 outputs the output target values (output current command value Ic2 and/or output voltage command value Vc2) of the second converter 22 to the second converter 22 via the control output terminal T16.

As in the case of the control circuit 41 of the first converter 21, the control circuit 42 of the second converter 22 obtains input voltage, input current, and output voltage (hereinafter, referred to as "input voltage Vi1", "input current Ii2", and "output voltage Vo1", respectively) of the second converter 22. In addition, the control circuit 42 receives the output target values from the control circuit 41 via the control input terminal T25. Then, the control circuit 42 generates and outputs the PWM control signals of the second converter 22, based on the obtained input voltage Vi1, input current Ii2 and the output voltage Vo1, and the output target values received from the control circuit 41.

Hereinafter, operation by the configuration of the present embodiment (refer to FIGS. 2 and 3) is explained while comparing the operation with typical operation of a conventional configuration (refer to JP-A-2003-164146 or the like) (refer to FIGS. 4 and 5). Note that, in FIGS. 2 to 5, Di indicates the diode rectification operation, and SR indicates the synchronous rectification operation. In addition, also in the conventional configuration, two DC/DC converters are connected in parallel with each other. One of the DC/DC converters is a master converter, and the other of the DC/DC converters is a slave converter. Practical use regions in FIGS. 3 and 5 are common use regions, that is, regions of output current Io which is produced most frequently while the electrically driven vehicle is driven.

Figure 2:
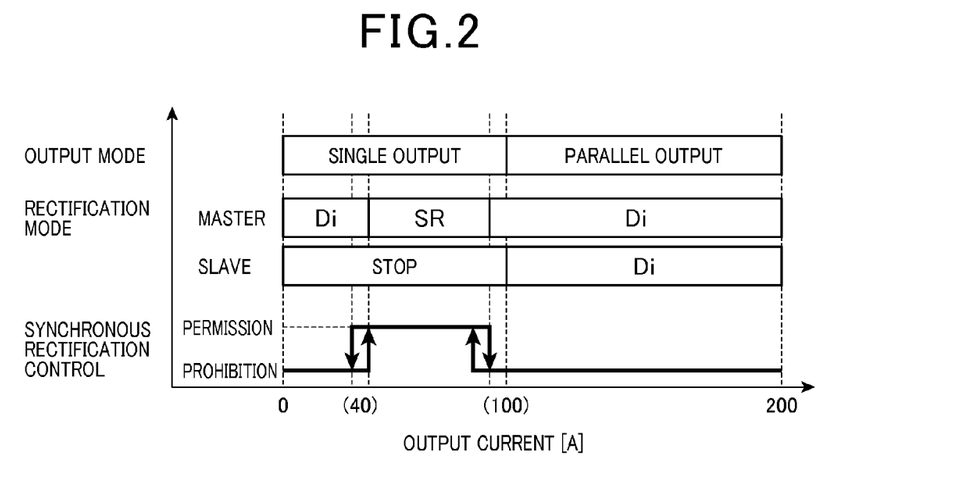
FIG. 2 is a time chart for explaining one example of operation of the power conversion apparatus shown in FIG. 1.
Figure 3:
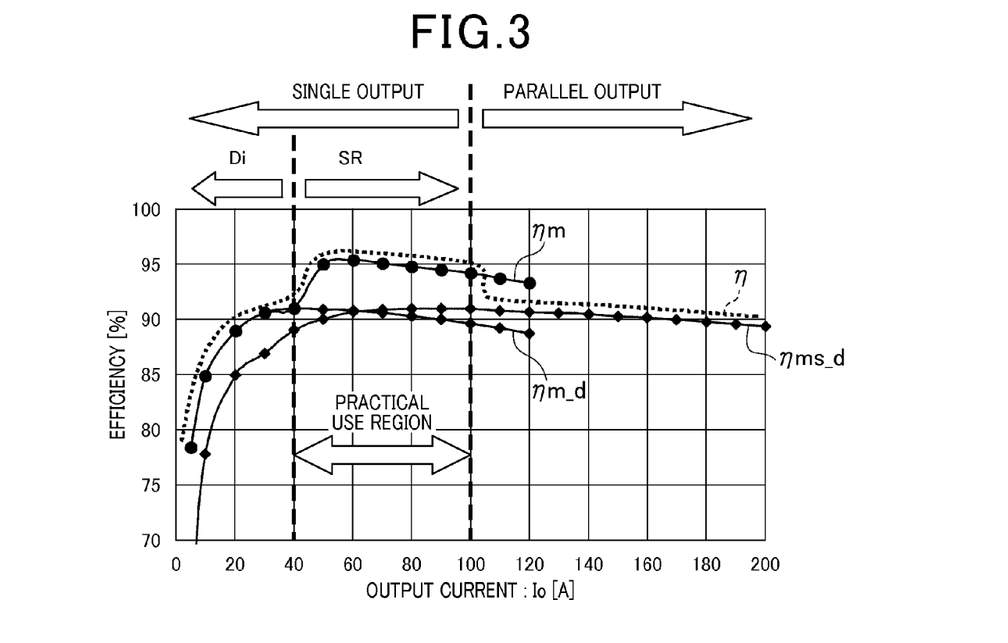
FIG. 3 is a graph for explaining one example of operation of the power conversion apparatus shown in FIG. 1.

Referring to FIGS. 2 and 3, if output current Io is less than a predetermined first threshold current (e.g. about 100 A), the control circuit 41 sets the output current command value Ic2 of the second converter 22 to 0. Hence, only the first converter 21, which is a master converter, performs output operation, and the second converter 22, which is a slave converter, stops output operation. Such an operation mode (output mode) is hereinafter referred to as "single output mode".

Meanwhile, if the output current Io is equal to or more than the first threshold current, the control circuit 41 sets the output current command value Ic2 of the second converter 22 to Io/2=Io1. Hence, the first converter 21, which is a master converter, and the second converter 22, which is a slave converter, operate so as to generate the same output current (Io/2). Such an operation mode (output mode) is hereinafter referred to as "parallel output mode".

More specifically, the control circuit 41 monitors the input current Ii1 of the first converter 21 based on the output of the input current sensor 352. If defining the obtained value of the input current Ii1 based on the output of the input current sensor 352 as Is, Io=Is in the single output mode and Io=2×Is in the parallel output mode can be determined. In addition, the control circuit 41 sets the output current command value Ic2 as described above. That is, the output mode is determined by the control circuit 41. Hence, according to the configuration of the present embodiment, operation of the power conversion apparatus 12 can be controlled based on the obtained value Is and the output current command value Ic2.

That is, for example, immediately after the electric power system 10 is activated (that is, immediately after the ignition switch provided in the electrically driven vehicle is turned on), and when the output current Io is a small value (e.g. about 20 A), the output mode is the single output mode (Ic2=0), and Io=Is. Thereafter, when the obtained value Is reaches the first threshold current, the output current command value Ic2 is set to half of the obtained value Is. Hence, the output mode becomes the parallel output mode. In this state, Io=2×Is is established. Meanwhile, in a case where the obtained vale Is is decreased over time in the parallel output mode (Ic2>0), when the obtained value Is becomes less than half of the first threshold current, the output current command value Ic2 is set to 0. In this state, Io=Is is established. Accordingly, using the obtained value Is of the input current Ii1 of the first converter 21 can control the operation change based on the output current Io without detecting the output current Io.

In addition, in the single output mode, if the output current Io (i.e. obtained value Is) is less than a predetermined second threshold current (e.g. about 40 A), the control circuit 41 stops operations of the switching elements 321$a$ and 322$a$ of the secondary circuit 32 of the first converter 21 (makes a control terminal input signal, that is, a gate signal, to be an off state). Hence, the first converter 21 performs the diode rectification operation.

In addition, in the single output mode, if the output current Io (i.e. obtained value Is) is equal to or more than the second threshold current, the control circuit 41 operates the switching elements 321$a$ and 322$a$ of the secondary circuit 32 of the first converter 21. Hence, the first converter 21 performs the synchronous rectification operation.

In addition, the control circuit 41 stops operations of the switching elements 321$a$ and 322$a$ included in the secondary circuit 32 of the first converter 21, prior to shifting from the single output mode to the parallel output mode according to the increase of the output current Io. Hence, when shifting from the single output mode to the parallel output mode according to the increase of the output current Io, the first converter 21, which has performed the synchronous rectification operation prior to the shift, is change to perform the diode rectification operation prior to the start of operation of the second converter 22.

Then, in the parallel output mode, the control circuit 41 stops operations of the switching elements 321$a$ and 322$a$ included in the secondary circuit 32 of the first converter 21. Hence, in the parallel output mode, the first converter 21 is driven so as to perform the diode rectification operation constantly.

In FIG. 3, ηms_d is a graph showing conversion efficiency, in a state where the output mode is the parallel output mode and both the first converter 21 and the second converter 22 perform the diode rectification operation (Io1=Io2=Io/2), in the whole output current region. In addition, ηm_d is a graph showing conversion efficiency, in a state where the output mode is the single output mode and the first converter 21 performs the diode rectification operation (Io1=Io, Io2=0), in the whole output current region. In addition, ηm is a graph showing conversion efficiency, in a state where the output mode is the single output mode in the whole output current region and the diode rectification operation and the synchronous rectification operation are changed therebetween by using the second threshold current. A broken line η is a graph showing conversion efficiency based on the operation shown in FIG. 2.

Figure 4:
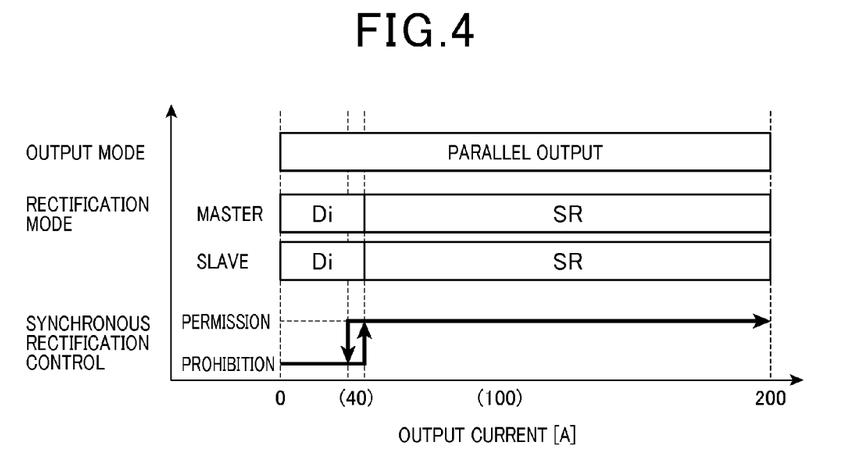
FIG. 4 is a time chart for explaining one example of operation of a conventional power conversion apparatus.
Figure 5:
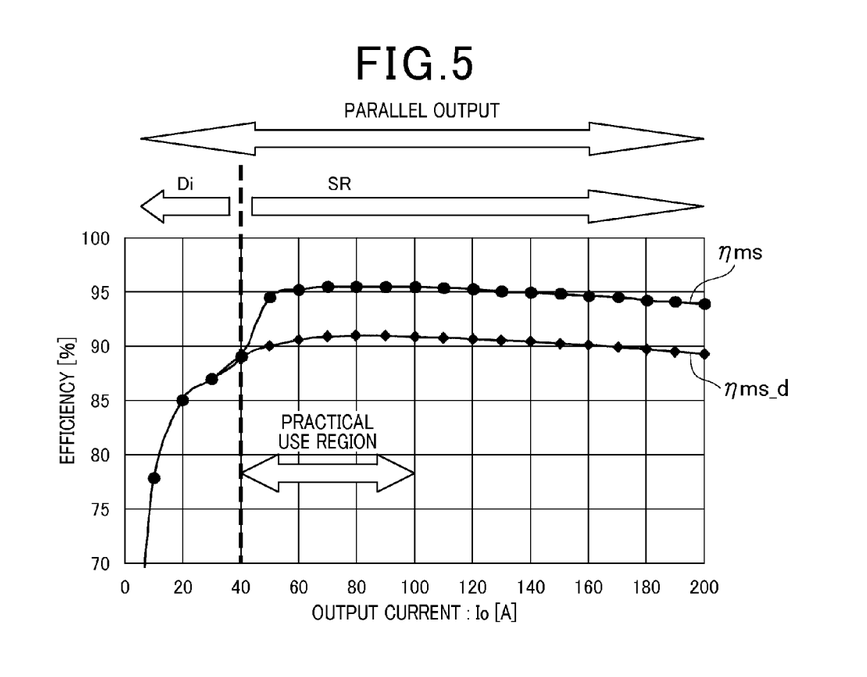
FIG. 5 is a graph for explaining the example of operation of the conventional power conversion apparatus

In contrast, referring to FIGS. 4 and 5, in a conventional configuration, if the output current Io is less than a predetermined threshold current (e.g. about 40 A, same as the second threshold current), both the master converter and the slave converter perform the diode rectification operation. In contrast, if the output current Io is not less than a predetermined threshold current, both the master converter and the slave converter perform the synchronous rectification operation.

In FIG. 5, ηms_d is a graph showing conversion efficiency, in a state where the master converter and the slave converter operate in parallel and perform diode rectification operation, in the whole output current region (the graph corresponds to ηms_d in FIG. 3). In addition, as shown in FIG. 4, ηms is a graph showing conversion efficiency, in a state where the master converter and the slave converter operate in parallel in the whole output current region and the diode rectification operation and the synchronous rectification operation are changed therebetween by using a predetermined threshold current.

Referring to FIGS. 3 and 5, regardless of an extremely simple circuit configuration in which the synchronous rectification type first converter 21 and the diode rectification type second converter 22 are simply arranged in parallel, high efficiency by the diode rectification can be achieved within a range where the output current Io falls in the practical use region.

Meanwhile, in a range different from the practical use region, the second converter 22 is stopped, and the first converter 21 is made to perform the diode rectification operation constantly in the parallel output mode. In addition, when shifting from the single output mode to the parallel output mode according to the increase of the output current Io, the operation of the first converter 21, which has performed the synchronous rectification operation before the shift, is changed to the diode rectification operation. Hence, a failure due to backflow of current at the secondary side of the transformer 30 can be prevented.

As described above, according to the present embodiment, the simple circuit configuration can improve conversion efficiency and reliability.

<Modifications>

Hereinafter, modifications of the embodiment are illustrated. In the following modifications, portions having configurations and functions similar to those described in the above embodiment may be provided with the same reference numerals. For explaining these portions, the explanations in the above embodiment may be appropriately employed within a range where technical contradictions do not arise. In addition, any of the portions of the above embodiment and any or all of the following modifications may be appropriately combined within a range where technical contradictions do not arise.

The circuit configuration is not limited to the above. For example, the primary circuit 31 of the first converter 21 and/or the primary circuit 31 of the second converter 22 may be a half-bridge circuit. In addition, the secondary circuit 32 of the first converter 21 may have a half-bridge circuit configuration.

The arrangement of the input current sensor 352 is not also limited to the above embodiment. For example, the input current sensor 352 may be provided at the low-voltage side input terminal T12 or between the primary circuit 31 and the primary coil 301. Instead of the obtained value Is of the input voltage Vi1 obtained based on output of the input current sensor 352 provided in the first converter 21, the output current command value Ic (the command value or the target value of the output current Io1) calculated by the vehicle ECU 15 may be used to perform setting and changing the output mode described above.

The output voltage Vo1 of the first converter 21 and the output voltage Vo1 of the second converter 22 may be the same or may be different from each other. Similarly, the output rating of the first converter 21 (rated value of the output current Io1) and the output rating of the second converter 22 (rated value of the output current Io2) may be the same or may be different from each other.

A hysteresis characteristic may be applied to the change of the output mode or the rectification mode. Hence, control hunting due to the changing operation can be effectively prevented.

The changing control of the output mode and the rectification mode may be performed by the vehicle ECU, which is a higher order than the control circuit 41, instead of the control circuit 41. In this case, the second converter 22 and the control circuit 42 may receive control signals from the vehicle ECU 15 as well as the first converter 21 and the control circuit 41.

The power conversion apparatus 12 may include three or more DC/DC converters connected in parallel with each other. In this case, the manner of changing the number of DC/DC converters to be operated is not limited to the above example (one←→two←→three). That is, when increasing and/or decreasing the number of DC/DC converters to be operated, the number of DC/DC converters to be operated may be changed between one and three (all). Specifically, the total number of DC/DC converters to be operated may be changed in such a manner, one→two→three→one, or one→three→two→one. Such a change of the number of DC/DC converters to be operated can be appropriately selected depending on the operating state and/or the specifications (output ratings of the DC/DC converters and the like) of the electric power system 10, that is, the electrically driven vehicle. Even when four or more DC/DC converters are arranged in parallel, the number of DC/DC converters is changed in a similar manner.

In the above embodiment, the first converter 21 including a set (group) of the transformer 30, the primary circuit 31 and the secondary circuit 32 and the like are arranged in parallel. However, the present invention may be appropriately applied to a configuration other than the above specific circuit configuration. For example, in FIG. 1, the circuit configuration of the first converter 21 and the circuit configuration of the second converter 22 may be provided in parallel between the high-voltage side input terminal T11 and the low-voltage side input terminal T12, and the high-voltage side output terminal T13 and the low-voltage side output terminal T14.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a power conversion apparatus includes: a first DC/DC converter (21) which includes a first transformer, a first primary circuit provided at a primary side of the first transformer, and a first secondary circuit provided at a secondary side of the first transformer, the first secondary circuit including sets of a switching element (321*a*, 322*a*) and a free-wheel diode (321*b*, 322*b*), which is connected between an input terminal and an output terminal of the switching element, to perform synchronous rectification operation and diode rectification operation; and a second DC/DC converter (22) which includes a second transformer, a second primary circuit provided at a primary side of the second transformer, and a second secondary circuit provided at a secondary side of the second transformer, the second secondary circuit including a plurality of rectifier diodes (324, 325), which are arranged in parallel with each other, to perform the diode rectification operation constantly.

In the power conversion apparatus, the first DC/DC converter is a synchronous rectification type DC/DC converter in which the synchronous rectification operation and the diode rectification operation can be changed therebetween. The second DC/DC converter is a diode rectification type DC/DC converter in which the diode rectification operation can be performed constantly.

According to the power conversion apparatus, the synchronous rectification type first DC/DC converter and the diode rectification type second DC/DC converter are connected in parallel with each other. Hence, the simple circuit configuration can improve conversion efficiency and reliability.

What is claimed is:

1. A power conversion apparatus, comprising:
   a first DC/DC converter which includes a first transformer, a first primary circuit provided at a primary side of the first transformer, and a first secondary circuit provided at a secondary side of the first transformer, the first secondary circuit including sets of a switching element and a free-wheel diode, which is connected between an input terminal and an output terminal of the switching element, to perform synchronous rectification operation and diode rectification operation;
   a second DC/DC converter which includes a second transformer, a second primary circuit provided at a primary side of the second transformer, and a second secondary circuit provided at a secondary side of the second transformer, the second secondary circuit including a plurality of rectifier diodes which are arranged in parallel with each other, to perform the diode rectification operation constantly; and
   a controller which controls the switching element of the first secondary circuit; wherein
   the first DC/DC converter is a master converter, and
   the second DC/DC converter is a slave converter.

2. The power conversion apparatus according to claim 1, wherein
   the controller sets an output target value of the second DC/DC converter and transmits the output target value to the second DC/DC converter.

3. A power conversion apparatus, comprising:
   a first DC/DC converter which includes a first transformer, a first primary circuit provided at a primary side of the first transformer, and a first secondary circuit provided at a secondary side of the first transformer, the first secondary circuit including sets of a switching element and a free-wheel diode, which is connected between an input terminal and an output terminal of the switching element, to perform synchronous rectification operation and diode rectification operation;
   a second DC/DC converter which includes a second transformer, a second primary circuit provided at a primary side of the second transformer, and a second secondary circuit provided at a secondary side of the second transformer, the second secondary circuit including a plurality of rectifier diodes which are arranged in parallel with each other, to perform the diode rectification operation constantly; and
   a controller which controls the switching element of the first secondary circuit; wherein
   prior to shifting the second DC/DC converter from an output stop state to an output operation state, the controller stops operation of the switching element, to make the first DC/DC converter perform diode rectification operation.

* * * * *